Patented Sept. 7, 1948

2,448,790

UNITED STATES PATENT OFFICE 2,448,790

PROCESS FOR THE PRODUCTION OF PENICILLIN

Jackson W. Foster and Lloyd E. McDaniel, Rahway, N. J., assignors to Merck & Co., Inc., Rahway, N. J., a corporation of New Jersey No Drawing. Application May 15, 1943, Serial No. 487,140

13 Claims. (Cl. 195—36)

This invention relates to improved processes for the production of penicillin.

Throughout this application where the term penicillin is used, it is intended to define that antibacterial substance produced by molds belonging to the genus Penicillium when the pH of the medium is near neutral or on the alkaline side, the properties of which substance have been described by Abraham, et al. (Lancet, 241, 177–89, 1941; and Br. Jr. Exp. Path., 23, 103–120, 1942); as distinguished from the different principle isolated and described by Coulthard, et al. (Nature, 150, 634–35, 1942); and Roberts (Jr. Biol. Chem., 147, 47–58, 1943), and which is formed by molds belonging to the genus Penicillium when the medium remains fairly acid, in the range of approximately pH 3.0 to 5.0.

The processes hitherto known for the production of penicillin involve the stationary surface-pad type of growth of Penicillium notatum in shallow layers of media. Such surface-pad stationary processes are disadvantageous for large-scale commercial operations.

We have now discovered a method whereby penicillin is produced by penicillin-producing strains of Penicillium, under submerged conditions. The submerged process of our invention possesses many advantages over the shallow-layer process, and represents a tremendous saving in space, labor, equipment, and time, with resultant economy in production costs. Through the practice of our invention, there is available for the first time a practical process for the large-scale commercial manufacture of penicillin.

According to our invention, penicillin is produced in high yields, under submerged conditions, employing aeration, or aeration plus mechanical agitation, when an aqueous medium is subjected to the action of penicillin-producing strains of Penicillium, such as Pen. notatum or Pen. chrysogenum, while maintaining the medium at a pH of about 6.0–8.5. We have found that, under such submerged conditions of penicillin formation, a luxuriant growth of the mold is achieved much more rapidly than in stationary cultures, and the organism grows homogeneously through the body of the liquid medium, in the form of small discrete colonies, and larger or smaller pieces of vegetative mycelium, and can be cultivated in suitable tanks. Furthermore, the rate of penicillin formation is markedly accelerated under submerged conditions according to our invention, and maximum penicillin formation is attained in a shorter period of time than is required under stationary surface growth conditions (2-6 days as compared to 7-14 days, or longer).

The aeration, or aeration and agitation, employed in our process can be obtained by means of any method or any device, or combinations of devices which ensure adequate solution of air throughout the medium. For example, air may be passed through the depth of medium in a deep tank, having been led into the tank through a simple pipe opening. Adequate solution of air may be secured by mechanical agitation, for example, by propellers or a turbo-mixer, or the solution of air may be achieved by passing it through sparger or similar devices which, in effect, comminute the air so that a larger air surface is presented to the cells suspended in the medium. In the latter case, the mechanical agitation may be reduced or eliminated altogether, the passage of the air through the liquid being sufficient to provide adequate agitation for the successful operation of the process.

Various media may be used for the production of penicillin under submerged conditions, according to our invention. For example, such media may contain nutrient material including a source of carbon and energy. In certain cases, to be described hereinafter, the media may further contain a complex organic mixture comprising nitrogenous substances.

In the medium, we may utilize nutrient mineral salts, as for example, nitrate salts, such as those of sodium, potassium, magnesium, calcium, etc., urea, ammonium salts, corn steep liquor, etc. Nutrient mineral salts may be utilized in various combinations and concentrations, the following substantially representing a typical composition: $NaNO_3$—6.0 gms.; $KH_2PO_4$—1.5 gms.; $MgSO_4.7H_2O$—0.5 gm.; per liter of water.

As a source of carbon and energy, we may utilize substances assimilable by penicillin-producing strains of Penicillium, including carbohydrates, glycerol, mixtures of the same, corn steep liquor, etc. The source of carbon and energy may be used in concentrations of 0.5–10%, and preferably in concentrations of 1–4%, per volume of medium.

Some substances, such as corn steep liquor, for example, contain both nutrient material and a source of carbon and energy assimilable by penicillin-producing strains of Penicillium, and, therefore, an aqueous medium of the same may be used for the production of penicillin, according to this invention.

We have found further that when a growth medium comprising nutrient mineral salts, and a source of carbon and energy, such as glycerol, brown sugar, dextrose, molasses, sucrose, starch, etc., is used, the rate of penicillin formation is promoted, if such medium is supplemented by the addition of certain complex organic mixtures comprising nitrogenous substances. Complex organic mixtures comprising nitrogenous substances which are useful for this purpose include corn steep liquor, soy bean cake meal, cotton seed meal, yeast extract, Penicillium autolysate, or the like.

If highly acid substances are used in the medium such as corn steep liquor, for instance, we have found it advisable to add a neutralizing agent, such as calcium carbonate, soluble alkalies as, for instance, NaOH or KOH, or mixtures of calcium carbonate and soluble alkalies. As an illustration, the neutralizing agent may be added in a quantity of about 0.2-10 gms. to a medium containing 30 ml. of corn steep liquor, per liter of medium, with good results. Instead of adding the neutralizing agent to the medium, the complex organic mixtures comprising nitrogenous substances may be treated therewith prior to addition to the medium.

For best results, the submerged process of our invention is preferably carried out at a temperature of 20-25° C. Although temperatures outside that range may also be employed.

Zinc salts, such as zinc sulfate, have a decided stimulating effect upon the production of penicillin, under submerged conditions, except in the presence of complex organic mixtures comprising nitrogenous substances, in which case, the zinc salt appears to be without effect. The zinc salt need not be added to the medium, but may be contained as an impurity in some or all of the other constituents, such as the water, or crude nutrient salts, in sufficient quantities to satisfy the requirements of the process.

Another feature of our invention resides in our discovery that, under submerged conditions, the production and accumulation of penicillin proceed very satisfactorily in tanks constructed of carbon steel.

In order to prevent foaming and frothing during sterilization of the medium, and during the submerged process, an effective antifoam agent, such as tributyl citrate or sulphonated castor oil, for example, may be added to the medium.

In carrying out the submerged process of our invention, a selected medium, in sterile condition, is inoculated with a heavy inoculum of a penicillin-producing strain of Penicillium, such as Pen. notatum or Pen. chrysogenum, and the process is permitted to proceed under conditions of aeration, or aeration and agitation until maximum penicillin activity is attained, as observed by assay of samples of the culture filtrates.

The following examples illustrate how this invention may be practiced, but it will be understood by those skilled in the art that variations thereof and substitutions of equivalents are within the broad scope of the invention.

*Example I*

To 600 gals. of a sterile medium containing per liter of water:

| | | |
|---|---|---|
| Corn steep liquor | mls | 30 |
| Brown sugar (grade #13 soft) | gms | 20 |
| NaNO$_3$ | gms | 6 |
| KH$_2$PO$_4$ | gms | 1.5 |
| MgSO$_4$.7H$_2$O | gms | 0.5 |
| CaCO$_3$ | gms | 5.0 | contained in a 750 gal. tank, is added a heavy inoculum of *Penicillium notatum*, and the mixture is aerated continuously by means of a ring pipe sparger having 1/16" holes. Air flow, 20 cu. ft./m.; pressure 8-12 lbs./sq. in. In five days, a sample of the culture filtrate assayed 40 Florey units/ml.

*Example II*

To 200 liters of a sterile medium containing per liter of water:

| | | |
|---|---|---|
| Corn steep liquor | mls | 30 |
| Brown sugar | gms | 20 |
| NaNO$_3$ | gms | 6 |
| KH$_2$PO$_4$ | gms | 1.5 |
| MgSO$_4$.7H$_2$O | gms | 0.5 |
| CaCO$_3$ (added separately) | gms | 5 |
| Tributyl citrate | cc | 200 | contained in a carbon steel fermenter equipped with propellers, is added a heavy inoculum of *Penicillium notatum*, and the mixture is aerated and agitated continuously. Air flow, 150 cu. ft./hr.; pressure, 5 lbs./sq. in.; propeller agitation, 400 R. P. M. In five days, a sample of the culture filtrate assayed 49.6 Florey units/ml.

*Example III*

To a sterile medium containing per liter of water:

| | | |
|---|---|---|
| Corn steep liquor | mls | 30 |
| NaNO$_3$ | gms | 6.0 |
| KH$_2$PO$_4$ | gms | 1.5 |
| MgSO$_4$.7H$_2$O | gms | 0.5 |
| CaCO$_3$ | gms | 5 |
| Molasses | per cent | 4 | is added a heavy inoculum of *Penicillium notatum*, and the mixture is aerated continuously under submerged conditions. In six days, a sample of the culture filtrate assayed 43.2 Florey units/ml.

*Example IV*

To a sterile medium containing per liter of water:

| | | |
|---|---|---|
| NaNO$_3$ | gms | 6 |
| KH$_2$PO$_4$ | gms | 1.5 |
| MgSO$_4$.7H$_2$O | gms | 0.5 |
| Molasses | per cent | 4 | is added a heavy inoculum of *Penicillium notatum*, and the mixture is aerated continuously under submerged conditions. In six days, a sample of the culture filtrate assayed 33.6 Florey units/ml.

*Example V*

To a sterile medium containing per liter of water:

| | | |
|---|---|---|
| Corn steep liquor | mls | 30 |
| NaNO$_3$ | gms | 6.0 |
| KH$_2$PO$_4$ | gms | 1.5 |
| MgSO$_4$.7H$_2$O | gms | 0.5 |
| CaCO$_3$ | gms | 5 | is added a heavy inoculum of *Penicillium notatum*, and the mixture is aerated continuously under submerged conditions. In four days, a sample of the culture filtrate assayed 22.4 Florey units/ml.

*Example VI*

To a sterile medium containing per liter of water:

| | | |
|---|---|---|
| Corn steep liquor | mls | 30 |
| NaNO$_3$ | gms | 6.0 |

| | | |
|---|---|---|
| KH$_2$PO$_4$ | gms | 1.5 |
| MgSO$_4$.7H$_2$O | gms | 0.5 |
| CaCO$_3$ | gms | 5 |
| Brown sugar | per cent | 1 |
| Glycerol | per cent | 1 | is added a heavy inoculum of *Penicillium notatum*, and the mixture is aerated continuously under submerged conditions. In six days, a sample of the culture filtrate assayed 60.8 Florey units/ml.

Example VII

To a sterile medium containing per liter of water:

| | | |
|---|---|---|
| Corn steep liquor | mls | 30 |
| NaNO$_3$ | gms | 6.0 |
| KH$_2$PO$_4$ | gms | 1.5 |
| MgSO$_4$.7H$_2$O | gms | 0.5 |
| CaCO$_3$ | gms | 5 |
| Glycerol | per cent | 2 | is added a heavy inoculum of *Penicillium notatum*, and the mixture is aerated continuously under submerged conditions. In six days, a sample of the culture filtrate assayed 55.2 Florey units/ml.

Example VIII

To a sterile medium containing per liter of water:

| | | |
|---|---|---|
| Corn steep liquor | mls | 30 |
| Brown sugar | gms | 20 |
| NaNO$_3$ | gms | 6.0 |
| KH$_2$PO$_4$ | gms | 1.5 |
| MgSO$_4$.7H$_2$O | gms | 0.5 |
| CaCO$_3$ | per cent | 0.5 | is added a heavy inoculum of *Penicillium chrysogenum* (Thom #5034.11), and the mixture is aerated continuously, under submerged conditions. In three days, a sample of the culture filtrate assayed 18.0 Florey units/ml.

Example IX

To a sterile medium containing per liter of water:

| | | |
|---|---|---|
| Corn steep liquor | per cent | 3 |
| CaCO$_3$ | per cent | 0.5–1 | is added a heavy inoculum of *Penicillium notatum*, and the mixture is aerated continuously, under submerged conditions. In four days a sample of the culture filtrate assayed 29 Florey units/ml.

Example X

To a sterile medium containing per liter of water:

3% soya bean meal is added a heavy inoculum of *Penicillium notatum*, and the mixture is aerated continuously, under submerged conditions. In three days a sample of the culture filtrate assayed 17 Florey units/ml.

Example XI

To a sterile medium containing per liter of water:

3% cotton seed meal is added a heavy inoculum of *Penicillium notatum*, and the mixture is aerated continuously, under submerged conditions. In four days a sample of the culture filtrate assayed 18 Florey units/ml.

Example XII

To a sterile medium containing per liter of water:

3% wheat germ is added a heavy inoculum of *Penicillium notatum*, and the mixture is aerated continuously, under submerged conditions. In five days, a sample of the culture filtrate assayed 21 Florey units/ml.

Example XIII

To a sterile medium containing per liter of water:

3% whiskey slop is added a heavy inoculum of *Penicillium notatum*, and the mixture is aerated continuously under submerged conditions. In five days, a sample of the culture filtrate assayed 8 Florey units/ml.

Modifications may be made in carrying out the present invention without departing from the spirit and scope thereof and we are to be limited only by the appended claims.

We claim:

1. A process for the production of penicillin which comprises subjecting an aqueous medium containing inorganic nutrient salts and a carbohydrate of the class consisting of molasses and brown sugar to the action of a penicillin-producing strain of a mold belonging to the genus Penicillium, under aerobic submerged conditions, while maintaining a pH of about 6.0–8.5.

2. A process for the production of penicillin which comprises subjecting an aqueous medium containing inorganic nutrient salts and a carbohydrate of the class consisting of molasses and brown sugar to the action of penicillin-producing strains of *Penicillium notatum*, under aerobic submerged conditions, while maintaining a pH of about 6.0–8.5.

3. A process for the production of penicillin which comprises subjecting an aqueous medium containing inorganic nutrient salts and a carbohydrate of the class consisting of molasses and brown sugar to the action of penicillin-producing strains of *Penicillium chrysogenum*, under aerobic submerged conditions, while maintaining a pH of about 6.0–8.5.

4. A process for the production of penicillin which comprises subjecting an aqueous medium containing inorganic nutrient salts and molasses to the action of a penicillin-producing strain of a mold belonging to the genus Penicillium, under aerobic submerged conditions, while maintaining a pH of about 6.0–8.5.

5. A process for the production of penicillin which comprises subjecting an aqueous medium containing inorganic nutrient salts, molasses, and a complex organic mixture comprising nitrogenous substances, to the action of a penicillin-producing strain of a mold belonging to the genus Penicillium, under aerobic submerged conditions, while maintaining a pH of about 6.0–8.5.

6. A process for the production of penicillin which comprises subjecting an aqueous medium containing inorganic nutrient salts, molasses, corn steep liquor, and a neutralizing agent, to the action of a penicillin-producing strain of a mold belonging to the genus Penicillium, under aerobic submerged conditions, while maintaining a pH of about 6.0–8.5.

7. A process for the production of penicillin which comprises subjecting an aqueous medium containing inorganic nutrient salts, molasses, corn steep liquor, and calcium carbonate, to the action of a penicillin-producing strain of a mold belonging to the genus Penicillium, under aerobic submerged conditions, while maintaining a pH of about 6.0–8.5.

8. A process for the production of penicillin which comprises subjecting an aqueous medium containing inorganic nutrient salts and brown sugar, to the action of a penicillin-producing strain of a mold belonging to the genus Penicillium, under aerobic submerged conditions, while maintaining a pH of about 6.0–8.5.

9. A process for the production of penicillin which comprises subjecting an aqueous medium containing inorganic nutrient salts, brown sugar, and a complex organic mixture comprising nitrogenous substances, to the action of a penicillin-producing strain of a mold belonging to the genus Penicillium, under aerobic submerged conditions, while maintaining a pH of about 6.0–8.5.

10. A process for the production of penicillin which comprises subjecting an aqueous medium containing inorganic nutrient salts, brown sugar, corn steep liquor, and a neutralizing agent, to the action of a penicillin-producing strain of a mold belonging to the genus Penicillium, under aerobic submerged conditions, while maintaining a pH of about 6.0–8.5.

11. A process for the production of penicillin which comprises subjecting an aqueous medium containing inorganic nutrient salts, brown sugar, corn steep liquor, and calcium carbonate, to the action of a penicillin-producing strain of a mold belonging to the genus Penicillium, under aerobic submerged conditions, while maintaining a pH of about 6.0–8.5.

12. A process for the production of penicillin which comprises subjecting an aqueous medium containing inorganic nutrient salts, brown sugar, corn steep liquor, and calcium carbonate to the action of penicillin-producing strains of *Penicillium notatum*, under aerobic submerged conditions, while maintaining a pH of about 6.0–8.5.

13. A process for the production of penicillin which comprises subjecting an aqueous medium containing inorganic nutrient salts, brown sugar, corn steep liquor, and calcium carbonate to the action of penicillin-producing strains of *Penicillium chrysogenum*, under aerobic submerged conditions, while maintaining a pH of about 6.0–8.5.

JACKSON W. FOSTER.
LLOYD E. McDANIEL.

REFERENCES CITED

The following references are of record in the file of this patent:

UNITED STATES PATENTS

| Number | Name | Date |
|---|---|---|
| 1,582,408 | Legg | Apr. 27, 1926 |
| 2,006,086 | May et al. | June 25, 1935 |

OTHER REFERENCES

Smith et al., Jr. Franklin Institute, vol. 233 (1942), page 598.

Hobby et al., "Proc. Soc. Exptl. Biol. Med.," vol. 50, pages 285 to 288 (1942).

Lucas, "Canadian Chemistry and Process Industries," September 1943, page 536.

Fleming, Br. Jr. of Exper, Pathol-10 (1929), page 226.

Clutterback et al., Biochemical Jr., 1932, plates 1907 to 1909.

Reid, Jr., Bacteriology, vol. 29, 1935, pages 215 to 217.

Abraham et al., The Lancet, August 16, 1941, page 177.

White et al., Jr. Bacteriology, May 1943, page 433.

Kocholaty, Jr. Bacteriology, October 1942, page 474.

Coghill, Progress Report No. 1, March 2, 1942, page 1.

Meyer et al., "An Improved Method for the Production of Penicillin." A paper distributed in N. Y. on December 17, 1941, pages 1 to 5.

May et al., Jr. Ind. & Eng. Chem., May 1934, page 575.